No. 813,629. PATENTED FEB. 27, 1906.
C. ELLIS.
GAS PRODUCER.
APPLICATION FILED MAR. 27, 1905.
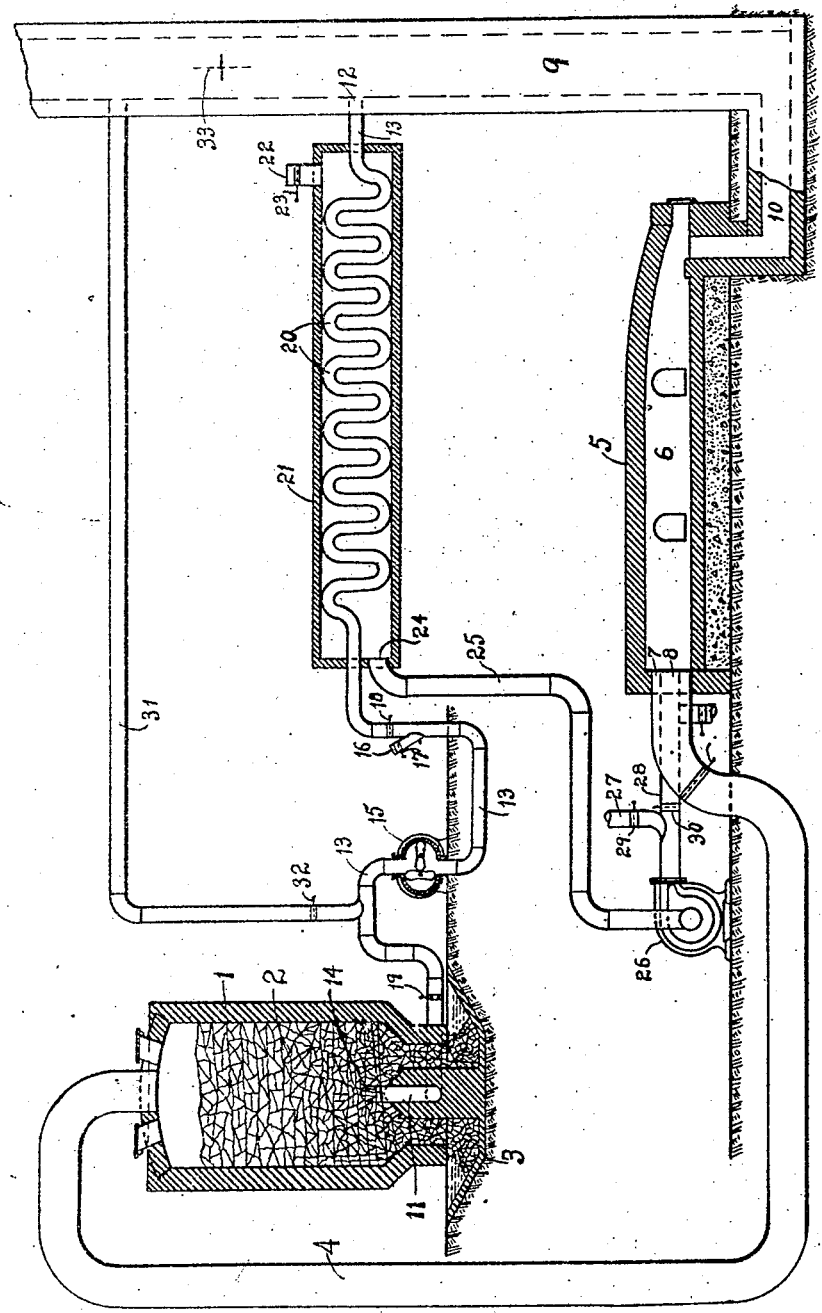
WITNESSES: INVENTOR

UNITED STATES PATENT OFFICE.

CARLETON ELLIS, OF NEW YORK, N. Y., ASSIGNOR TO COMBUSTION UTILITIES COMPANY, OF NEW YORK, N. Y., A CORPORATION OF NEW YORK.

GAS-PRODUCER.

No. 813,629.

Specification of Letters Patent.

Patented Feb. 27, 1906.

Application filed March 27, 1905. Serial No. 252,407.

*To all whom it may concern:*

Be it known that I, CARLETON ELLIS, a citizen of the United States, and a resident of New York city, in the county of New York and State of New York, have invented certain new and useful Improvements in Gas Producing and Consuming Apparatus, of which the following is a specification.

This invention relates to apparatus intended for making combustible gas by the "producer" process as distinguished from the retort and water-gas processes, and it involves, essentially, the use of carbon dioxid in the gas-generating draft-current.

It is the object of the present invention to dispense with the use of steam as a cooling agent within the producer, to secure a better quality of gas, to permit the employment of accelerated draft without incurring excessive temperatures, and to permit the producer to be operated at a lower temperature, as well as to secure a great operative range and increased flexibility of adjustment to meet the varying conditions arising with the different grades and kinds of fuel. To this end I employ a draft-current composed in part of neutral endothermically-reacting fixed gas, such as carbon dioxid, which may conveniently be derived from the stack-gases of a furnace or other available source.

Prior attempts have been made to devise a system for utilizing the gasified carbon of the waste stack-gases and securing the benefits of that economy in fuel consumption, which theoretically results from the fact that less heat is required to reduce carbon dioxid to carbon monoxid than is needed in first gasifying solid fuel and then reducing the carbon dioxid. Such systems have necessitated the employment of steam as a cooling agent.

The failure to devise a practical system for utilizing the waste gases without using steam to cool the producer has, I apprehend, been due to the following principal causes: first, the employment of the furnace-gases at an extremely high temperature; secondly, the use of gases deficient in carbon dioxid without substantial cooling; thirdly, the employment of draft-accelerating means having inadequate provisions for regulating the oxygen and endothermic constituents of the draft-current independently and in the correct proportions.

I find that the ordinary run of furnace-gases, especially when the furnaces are operated, as usual, with a large excess of air in order to secure complete combustion, are so weak in carbon dioxid that their endothermic action within the fuel-bed of the producer is insufficient to overcome the high temperature at which it has been proposed to introduce them, and as a consequence the producer either runs so hot as to produce large quantities of soot, melted slag or clinkers, and carbon dioxid, or it becomes necessary to employ steam in large quantities in an effort to reduce the temperature to a practical working-point. These devices have also suffered from the inflexible control afforded by a jet of air or steam which they were compelled by their high temperature to employ as a draft-accelerator in lieu of a fan or equivalent mechanical device, since such a jet adds its own quota of reacting fluid to the draft-current, and when used in the way proposed a variation in the propelling power of the jet fails to result in maintaining the composition of the draft-current in the correct proportions with reference to the temperature of the stack-gases and their richness in carbonic acid.

By the use of carbon dioxid in this manner a considerable saving in fuel results through the complete combustion of the fixed carbon of the coal in the producer to carbon monoxid. As ordinarily operated by the use of steam the producer is incapable of burning all of its carbon to carbon monoxid, and a loss in heat energy results. A portion of this carbon of necessity burns to carbon dioxid. This is due to the fact that ignited or incandescent carbon is incapable of effecting a complete reduction of carbon dioxid no matter how great the depth of fuel through which the gas is passed. In other words, there is a certain amount of carbon dioxid present in the producer-gas, due to the inability of ignited carbon effecting complete reduction. A certain partial pressure of carbon dioxid therefore remains to be satisfied, and this has to be done at the expense of the carbon of the coal. By the system which I make use of the carbon dioxid required to create the aforesaid partial pressure is supplied from an external source and, as a result none need be internally generated to supply this demand. The net result of the combustion conducted in this manner, in so far as the partial-pressure considerations above stated are concerned, is the complete conversion of the fixed carbon to carbon monoxid or combustible gas. It is also necessary to take into account the velocity reactions, on account of which the fuel under forced draft will slag even with stack-gases theoretically rich enough in $CO_2$ to maintain a non-slagging temperature, because, probably, of the fact that at high temperatures carbon manifests a selective affinity for oxygen in preference to carbon dioxid, which is not so apparent when the draft-current is cooled, the exothermic and endothermic reactions in the latter case occurring at speeds more nearly approximating each other.

My invention involves control of the temperature and proportions of the cooling agent with reference to its richness in endothermic constituent, and for the practice of said invention the following conditions are essential—namely, supplying the diluent gas in such a condition, effected either by cooling it or deriving it of a composition sufficiently rich in endothermic constituent as to maintain the temperature of the producer below the point at which soot, slag, or clinkers form in objectionable quantities and the predetermined independent regulation or adjustment of the respective proportions of free oxygen and neutral or endothermic gas in the draft-current. For the latter result I prefer to employ a mechanical draft-accelerator, such as a fan-blower, combined with a suitable damper or dampers, enabling the ratio of air and diluent to be adjusted at will. The cooling of stack-gases prior to their passage through the blower serves to protect the latter from injury.

Cooling of the products of combustion may be conveniently effected by leading them to the producer through a relatively long pipe subjected to radiation and convection of heat or through a pipe subjected to artificial cooling by deportation of heat from its surface or contents.

My invention is particularly adapted, though not necessarily confined, to an organization in which the gas-producer is functionally and structurally remote from the consuming apparatus, because, from the fact that I operate the producer at a low temperature, there is little need of attempting to utilize the sensible heat of the producer-gas; and the necessary length of the return-conduit for the products of combustion in many cases may dispense with other special provisions for cooling these products.

The accompanying drawing represents a sectional view of an apparatus constructed and arranged in accordance with my invention and embodying a gas-producer and a reverberatory furnace, together with other features necessary to effect the object above stated.

1 indicates the gas-producer, comprising a generating-chamber adapted to contain a deep bed of fuel 2 and having suitable inlet-apertures for feeding fuel from the top and a water seal 3 at the lower end, from which the ashes are removed. The lower end of the producer is of less diameter than the upper end. A gas-producer of this sort is well suited for the generation of gas by my method, inasmuch as the constricted area in the lower part of the producer prevents the free passage of air or oxygen along its side walls, thus allowing no air to get around the bed of fuel and to cause combustion at the top of the fuel mass, it being my object in the production of the gas to preserve a non-flaming mass of fuel at a low red heat, and any receptacle which does not allow of operation in this manner is not wholly satisfactory for the purpose aforesaid.

4 is a gas-pipe connecting the upper end of the producer with a reverberatory furnace 5, of which 6 is the hearth-chamber, 7 8 the gas and air entrances, 9 the stack, and 10 the connecting or stack flue. The furnace is adapted to the burning of gas. Hence no fire-boxes are shown. From a point 12 in the stack or stack-flue a pipe or conduit 13 leads back to the boshes of the producer 1 and enters the same by twyers 14, whereby products of combustion may be returned from the furnace to the hottest part of the fuel-bed and passed therethrough. This conduit contains a blower 15. In the drawing a positive blower of the impeller-wheel type has been shown, as this allows the attainment of high pressures in the gas-producer, and the gas may thus be generated under a tension higher than that ever before economically obtained in steam-operated producers. A fan blower or exhauster may also be employed. Back of said blower there is an air-inlet 16 to the conduit for supplying air to the stack-gases for supporting combustion and cooling the gases. The air-inlet and the trunk of the pipe 13 are equipped with valves or dampers 17 18, whereby the proportions of air and products of combustion in the draft-current may be accurately and independently regulated with especial reference to the temperature of the stack-gases and their richness in $CO_2$ and the slagging-point of the particular fuel which is being burned, so as to give the desired results in maintaining combustion within the producer at a temperature below the slagging and sooting point. These valves are adjusted to provide an air-supply insufficient for the combustion of the gas after it emerges from the bed of fuel, so that the output of the producer shall be a combustible gas which may be conducted to any desired point of use and there burned with oxygen. The pipe 13 also has a valve or damper 19 for regulating the volume of the producer-blast.

Interposed in the conduit 13 is a heat-radiating or cooling means for the removal of heat from the products of combustion. As shown, the conduit 13 is convoluted or formed into a series of parallel passages 20, inclosed by the receptacle 21. This receptacle has an opening 22 for the admission of air or other cooling medium, the supply of which is controlled by valve 23, and an outlet 24 for the removal of the cooling agent through the passage 25. In this case a method of air-cooling has been shown, and in consequence a fan-blower 26 has been placed in the conduit 25 in order to secure an effective draft through the cooler. The radiating-passages are proportioned to remove such an amount of heat from the products of combustion that the latter are fitted for conducting gasification in the producer. The air which passes over and around the radiating-pipes departs through passage 25, from whence it may be discharged through the passage 27 into the open air or elsewhere, or it may enter the furnace through pipe 28. The valves 29 and 30 determine the direction of discharge.

31 is a by-pass connecting the conduit 13 on the exhaust side of the blower. It is provided with the valve or damper 32. This allows, if desired, of the removal from the stack end of the passage through the radiator of all or nearly all of the products of combustion. Such portion of these products as are needed may be introduced into the gas-producer. The remainder may be passed through the passage 31 back into the stack. In that manner a large portion of the heat of the stack-gases may be extracted and used for heating air or for other useful purposes.

The radiator 21 may be supplied with water instead of air or other cooling medium which effects a positive cooling of the gases. I do not rely upon the use of steam injected into the hot products of combustion to effect the requisite cooling, as such a method involves simply the transference of heat from the products of combustion to the steam and does not put them in a proper condition for economical manufacture of gas. As it is important to have the quantities of the gases entering into the reactions involved in the operation of this apparatus carefully proportioned and adjusted for the production of combustible gas low in carbon dioxid and rich in combustible elements, I find it essential to place in the various conduits the valves or gates by which the necessary regulation and control of the system may be obtained.

It is frequently desirable to have an arrangement for adjusting the valves 17, or both 17 and 18, from the coal-feeding floor. Thereby a means is provided for quickly adjusting the proportion of carbon dioxid to meet sudden changes or fluctuations in the composition of the stack-gases. In using anthracite coal such a method of variable endothermic control may prove unsuitable, as with the low volatile matter characteristic of such fuel an increase at the time of firing in the percentage of carbon dioxid in the producer-draft may prove desirable.

The depth of the fuel-bed is also variable, depending on the physical and chemical characteristics of the fuel in question. Such a depth of fire must be maintained that no appreciable amount of oxygen reaches the upper surface of the gas-producing mass.

The furnace 5 is operated in the usual way, the gas and air being admitted through entrances 7 and 8, respectively, combustion taking place on the hearth or laboratory 6 and the products of combustion passing into the stack 9 by way of the flue 10. A portion of the products of combustion is drawn from the stack at 12 into the conduit 13, passing through the L or cooling tubes 20, and is forced through the producer under accelerated draft in company with free oxygen which is supplied through the inlet 16 and may be furnished in part from the excess of uncombined oxygen in the furnace 5. The remaining portion ordinarily passes up the stack. That part of the products of combustion which goes through said pipe to the producer is cooled in passing through the radiator 21, and the cooling action may be supplemented by dissipation of heat to the atmosphere from the exposed surfaces of the pipe 13. Where the length of the exposed portions of the return-pipe is sufficiently great, it is possible to omit radiator 21, as the loss in heat in transmission through a long exposed conduit will in itself under certain circumstances afford a sufficient diminution in the temperature. Such portions of products of combustion as are not needed in the gas-producer may be discarded by opening the gate 32 and permitting their discharge into conduit 31, from which they enter the stack. It is possible in this way to cause all or nearly all of the products of combustion to traverse conduit 13, using, of course, such portions as may be needed for regulating and depressing the temperature of the gas-producer below the point at which troubles are likely to arise from the production of soot and clinkers and clogging of the producer from the latter cause.

In the gas-producer a deep bed of ignited fuel or coal is maintained in order that the carbon dioxid and the oxygen supplied in the draft-current may be very completely reduced to carbon monoxid. The adjustment of the gates 17 and 18 allows of the regulation of the proportion of endothermic constituent, and this will vary with the nature of the fuel, as aforesaid. Certain anthracite coals because of their tendency to clinker require nearly double the amount of endothermic constituent that should be used for the operation of certain bituminous coals low in ash. The volume of the blast may be regulated by the adjustment of damper 19 or by regulating the speed of the fan 15. The pressure of the blast to the twyers in ordinary operation by steam-jet is from one to two ounces. The increase in pressure over this requires the use of so much steam that regulation of the temperature is difficult. High blast-pressures are desirable because of the more rapid gasification of the coal, thereby reducing the number of gas-producers in the operation of a furnace or set of furnaces, and consequently making a more compact and economical equipment.

The method of steam operation as at present employed does not permit of the operation under the high tension which economy demands. My invention makes possible the operation under the desired pressures. Furthermore, the independent regulation of the proportions of the carbon dioxid, together with the efficient cooling of the gases secured by my apparatus, makes it possible to operate the producer continuously without formation of troublesome soot and clinkers.

It will be observed that this apparatus avoids the use of steam, which has heretofore been a requisite in keeping down the temperature, especially with forced draft. Besides the other advantages enumerated a very considerable saving is effected in the consumption of fuel hitherto required to make steam for cooling the producer. The quantity of steam needed to run the engine for driving the fan is a very small proportion of that heretofore used for cooling. The presence of steam in moderate amounts would not interfere with the continuance of my process; but the necessity of employing it as a primary cooling agent is entirely done away with.

My invention has been in successful practical use during a considerable period of time in connection with various heating operations on a large scale. In one rolling-mill where the apparatus was installed there was found an average saving in consumption of fuel in the producer amounting to thirteen per cent. during a practically continuous period extending over four months without taking into account any saving in fuel which was caused by abandoning the use of steam in the producer. The quality of the gas was found much superior to its quality before the use of my apparatus. There was almost an entire freedom from soot and no trouble from clinkers. The output of the furnace was increased, the steel heated evenly and thoroughly, and the waste in the process of heating and rolling was considerably diminished.

In a copending application, Serial No. 233,800, filed November 22, 1904, on which Patent No. 790,253 was granted May 16, 1905, I have shown a means for using products of combustion for the control of temperature of the gas-producer and have indicated a practical method for treating these products of combustion preparatory to use in the gas-producer, which consists in cooling the products of combustion through the agency of regenerative devices or checker-work which have been previously air-cooled. This invention relates to gas producing and consuming apparatus in which the products of combustion utilized in the producer are cooled in a suitable manner by some cooling or heat-extracting device located, preferably, external to the furnace or regenerator.

What I claim as new, and desire to secure by Letters Patent, is—

1. In a gas making and using apparatus, the combination of a gas-fired furnace, a gas-producer for supplying gas thereto, means for supplying the producer with air, means for delivering products of combustion from the furnace to the producer and externally-cooled means for removing heat from said products prior to their entry into the producer.

2. In a gas-producing plant, the combination of a furnace producing products of combustion weak in carbon dioxid, a gas-producer, means for introducing a portion of said products into the producer and externally-cooled means for removing heat from the products prior to their entry into the producer.

3. In a gas-producing plant, the combination of a gas-producer, a furnace furnishing products of combustion containing an excess of oxygen and means for introducing a portion of said products into the producer, said means including a surface cooler.

4. In a gas-producing plant, the combination of a gas-producer provided with an air-feed of means for introducing controlled proportions of cold products of combustion into said air-feed.

5. In a gas-producing plant, the combination of a furnace furnishing products of combustion weak in carbon dioxid, a gas-producer, a conduit for conducting a portion of said products to the gas-producing zone of the producer, a mechanical draft-accelerator in said conduit, externally-cooled means for abstracting heat from said products forming a portion of the conduit, means for furnishing air to the producer and means for regulating the proportions of air and of products introduced.

6. In a gas-producing plant, the combination of a gas-producer and means for furnishing cold products of combustion to said producer under forced draft.

7. In a gas-producing plant, the combination of a gas-producer and means for furnishing air and cold products of combustion to said producer under a forced draft.

8. In a gas-producing plant, the combination of a gas-producer, a source of products of combustion, a pipe connection between such source and the producer, and a casing for containing cooling fluid mounted on the pipe connection.

9. In a gas-producing plant, the combination of a gas-producer, a source of products of combustion, a pipe connection between such source and the producer, a casing for containing cooling fluid mounted on the pipe connection, a fan for transmitting products of combustion through the pipe connection, and an air-inlet in the suction side of the fan.

10. In a gas-producing plant, the combination of a furnace, a gas-producer, a pipe connection delivering products of combustion from the furnace into the producer, a casing mounted on the pipe connection and having an air-inlet and means for inducing an air-flow through said casing to cool the products of combustion and for delivering the air heated thereby to assist combustion in the furnace.

11. In a gas-producing plant, the combination of a furnace, a gas-producer, a pipe connection delivering products of combustion from the furnace into the producer, a pipe connection delivering gas from the producer into the furnace, a casing mounted on the first pipe connection, and means for drawing air through the casing to cool the pipe and for delivering the air to the furnace to assist in the combustion of the gas.

12. In a gas making and using plant, the combination of a gas-producer, a gas-using device fed thereby, a chimney-stack for the latter, a pipe tapping the chimney, a cooling-casing surrounding the pipe, a fan drawing products of combustion through the pipe and delivering the same into the producer and a valved air-inlet on the pipe on the suction side of the fan.

13. In a gas making and using plant, the combination of a gas-producer, a gas-using device fed thereby, a chimney-stack for the latter, a pipe tapping the chimney, a cooling-casing surrounding the pipe, a fan and pipe connections for drawing air through the casing and delivering into the furnace provided with an excess-outlet on the pipe connections on the pressure side of the fan, a fan and pipe connections for withdrawing products of combustion from the chimney through the first-mentioned pipe and delivering the same into the producer.

14. In a gas making and using plant, the combination of a gas-producer, a gas-using device fed thereby, a chimney-stack for the latter, a pipe tapping the chimney, a cooling-casing surrounding the pipe, a fan and pipe connections for drawing air through the casing and delivering into the furnace, a fan and pipe connections for withdrawing products of combustion from the chimney through the first-mentioned pipe and delivering the same into the producer, and a valved waste-outlet on the pipe connection between the producer and the fan.

Signed at New York city, in the county of New York and State of New York, this 22d day of March, A. D. 1905.

CARLETON ELLIS.

Witnesses:
JAS. K. CLARK,
A. M. SENIOR.